United States Patent [19]
Freese

[11] 3,799,346
[45] Mar. 26, 1974

[54] APPARATUS AND METHOD FOR TREATING SEWAGE

[76] Inventor: Ronald Freese, P.O. Box 4, Ayr, Ontario, Canada

[22] Filed: July 22, 1971

[21] Appl. No.: 165,207

Related U.S. Application Data

[63] Continuation-in-part of Ser. No. 821,719, May 5, 1969, abandoned.

[52] U.S. Cl............ 210/124, 210/195, 210/207, 210/221, 210/320
[51] Int. Cl............ C02c 1/06, C02c 5/06
[58] Field of Search.............. 210/3-8, 12-15, 210/124, 86, 194, 195, 220, 221, 252, 259, 320

[56] References Cited
UNITED STATES PATENTS

| | | | |
|---|---|---|---|
| 3,497,064 | 2/1970 | Valdespino | 210/195 X |
| 3,118,835 | 1/1964 | Butler et al. | 210/14 X |
| 3,697,053 | 7/1972 | Koulovatos | 210/124 X |
| 2,562,510 | 7/1951 | Schlenz | 210/5 |
| 2,987,186 | 6/1961 | Burgoon et al. | 210/13 X |
| 2,419,492 | 4/1947 | Green | 210/13 X |
| 3,311,239 | 3/1967 | Valdespino | 210/195 X |

Primary Examiner—Samih N. Zaharna
Assistant Examiner—Thomas G. Wyse
Attorney, Agent, or Firm—Peter Kirby

[57] ABSTRACT

An improved sewage treatment plant is described having a primary waste receiving and mixing vessel, an aeration vessel and a settling tank. Material from the primary mixing vessel is pumped into a bottom region of the aeration vessel by means of a pump and a venturi aerator is provided for introducing air into the stream of sewage being pumped into the aeration vessel. The aeration vessel is of unique design and contains a series of downwardly inclined baffles which are arranged to trap pockets of air and to circulate the sewage along a tortuous path across these air pockets. A recycling system is provided for recycling a portion of aerated sewage from a top region of the aeration vessel back into the primary mixing vessel for mixing with the raw, unaerated sewage and a second recycling system is provided for recycling a portion of aerated sewage from an upper region of the aeration vessel into the stream being pumped into the lower region of the aeration vessel.

8 Claims, 13 Drawing Figures

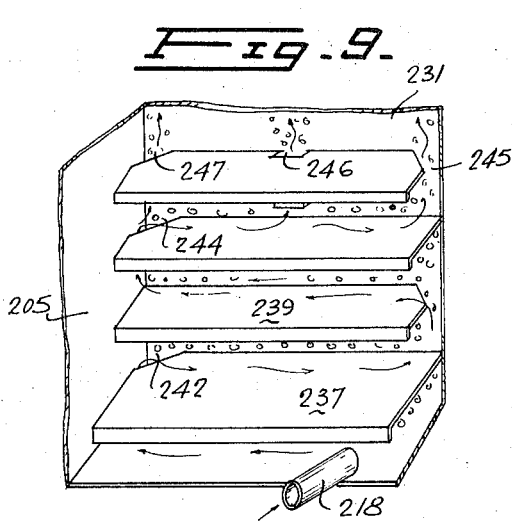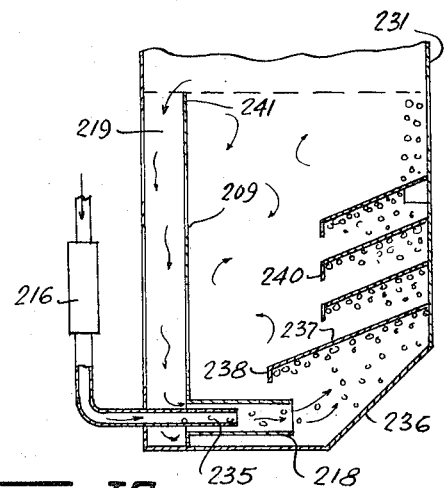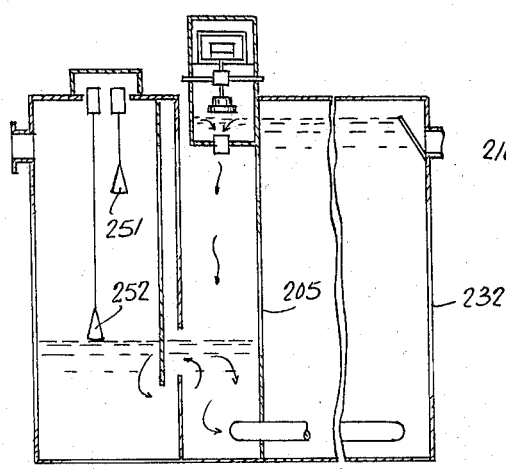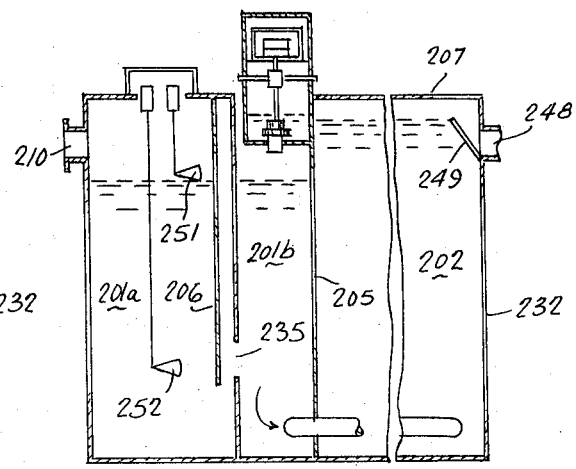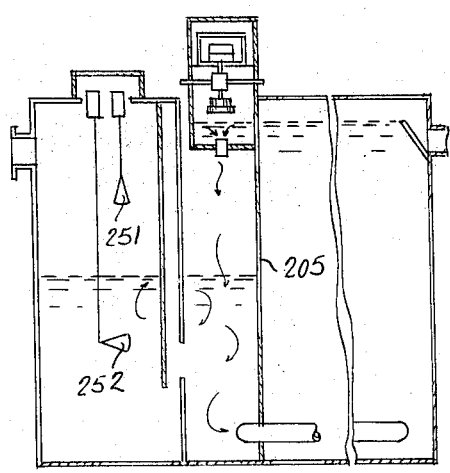

APPARATUS AND METHOD FOR TREATING SEWAGE

The present application is a continuation-in-part of U.S. Application Ser. No. 821,719, filed May 5, 1969 (now abandoned).

BACKGROUND OF THE INVENTION

1. Field of the Invention

This invention relates to a sewage treatment plant and, more particularly, to an improved treatment unit of the complete oxidation type.

2. Description of the Prior Art

There was a time when virtually all liquid wastes were turned loose into the nearest stream or lake irrespective of odor, colour, or toxicity. Today, stringent procedures are required by or imposed by most municipalities, manufacturers, developers, home owners, etc., to insure adequate disposal of waste waters, with the result that much time and energy are spent in ascertaining how either to neutralize the waste, to destroy it, or to turn it into something useful.

In the usual aerobic sewage treatment system, the first step is to reduce incoming raw waste to a suspension of small particles in a liquid by means of comminutors at the inlet end of the system. This suspension is then aerated by the injection of air into the sewage or by permitting the sewage to come into contact with the atmosphere in large open ponds. The aeration of the sewage produces waste-digesting microorganisms by oxidation. The oxidized waste, known as activated sludge, is separated from the suspension and the liquid remaining is treated with a chlorine compound to oxidize any remaining unstable organic matter in the liquid. This liquid can then be safely discharged and the unactivated sludge is returned to the inlet end of the system for mixing with the untreated sewage, whereby the microorganism population in the sludge is not wasted by discharge from the system.

A great deal of work has been done on large systems which will handle entire municipalities or cities, but much less has been done on small systems for handling relatively small volumes of sewage such as on board ships, at summer resorts, restaurants, small housing developments etc. The main problem to date with the small systems that have been developed is that they are still too large and expensive and thus do not have commercial acceptance. There is, therefore, still a great need for decreasing the size and complexity of the systems so that they can be provided in the form of an inexpensive and compact package which is easily transportable, which is economical to operate and install and which can be prefabricated before being shipped to the installation site.

In the aerobic system, one of the main limiting factors of size is the efficiency of oxygen transfer for the aerobic breakdown of the sewage material. Oxygen in the form of air is normally diffused into the liquid sewage from bubbles and when these bubbles are diffused into the liquid, this liquid tends to saturate the film surface of the bubble preventing further diffusion. High turbulence and mixing currents are required to remove the oxygen saturated film from the surface of the bubbles so as to increase the diffusion of oxygen into the liquid.

One such attempt to improve aeration efficiency is described in Butler et al. U.S. Pat. No. 3,118,835 issued Jan. 21, 1964. In the Butler et al. system, the aeration chamber has special baffle plates which effectively divide the aeration chamber into four quadrants and retain the sewage in each quadrant for its full treatment time. The main purpose of these baffles is to prevent a short circuit by the sewage from the sewage inlet to the outlet of the chamber. However, the above system does not take into consideration the problem of how to actually increase the amount of oxygen diffused into the liquid while maintaining a good flow pattern through the vessel.

It is the object of the present invention to provide an aerator design and sewage flow path which will give not only a long retention time of the air with the sewage but also repeatedly break the entrapped air bubbles so as to obtain a maximum amount of oxygen transfer, thus minimizing the space needed for the aeration vessel.

SUMMARY OF THE INVENTION

According to the present invention, a primary waste receiving and mixing vessel is provided for receiving raw sewage and breaking down the larger pieces of raw waste to a suspension of small particles in a liquid. This suspension is pumped into a bottom region of an aeration vessel by means of a pump and a venturi aerator is provided on the outlet side of the pump for introducing air into the stream of sewage being pumped into the aeration vessel.

The aeration vessel itself contains a series of downwardly inclined baffles which are arranged to trap pockets of air and to circulate the sewage along a tortuous path across these air pockets. A recycling system is provided for recycling a portion of aerated sewage from a top region of the aeration vessel back into the primary mixing vessel for mixing with the raw, unaerated sewage and a second recycling system is provided for recycling a portion of aerated sewage from an upper region of the aeration vessel into the stream being pumped into the lower region of the aeration vessel.

A settling tank is provided in fluid communication with the aeration vessel for receiving aerated sewage from the aeration vessel and separating activated sludge from the liquid portion of the sewage. The liquid portions thus obtained can be chlorinated in the usual manner and the separated activated sludge is returned to the aeration vessel for mixing with the aerated sewage.

The aeration vessel, which is the heart of the present invention, can be of a variety of configurations and is preferably either cylindrical or rectangular. The rectangular tank is particularly preferred from the standpoint of ease of construction and it preferably has a series of downwardly inclined baffles extending inwardly from one sidewall with the raw sewage inlet in the opposite sidewall in a bottom region. With this arrangement, the sewage-air mixture entering the vessel flows beneath the lowermost baffle and openings are provided in the baffles alternately at opposite ends whereby the flow can travel across beneath each baffle upwardly through the end opening, across beneath the next uppermost baffle, et seqq. to the top of the vessel.

The usual method of aerating sewage is by air blowers discharging the air through diffusers which are installed low in the aeration vessel and to one side. The volume of air passing through the diffusers up the side of the vessel creates a circulation of the waste to bring all of the contents of the vessel into contact with the incoming air. The volume of air required to treat 1 gallon of domestic sewage is usually estimated at about 1½ to about 4 cubic feet. However, with such a prior system, a total volume of 7 to 10 cubic feet of air per gallon of sewage must actually be used, the excess air being required to create the necessary circulation and mixing action. With the prior system, the bubbles rise quickly to the surface and have a very short retention time to transfer oxygen to the sewage. It has been estimated that there is a 5 percent to 15 percent oxygen transfer, 50 percent of this transfer being from the bubbles below the liquid surface and the remaining 50 percent from surface aeration when the bubbles break.

Thus, it will be seen that by providing the series of air pockets in the aeration vessel at different elevations and providing a turbulent flow of liquid and air through the vessel, the result is in effect a series of surface releases of bubbles along with the usual turbulent flow of mixing. These two combined actions which are obtained in the aeration vessel of the present invention greatly improve its efficiency and thus can substantially reduce its volume and total size.

According to a particularly preferred feature of the invention, the recycled stream to the primary mixing vessel can be provided with a shut-off valve. The system is arranged so that when the shut-off valve is open, the volume of pump discharge displaces a like volume of liquid from the aeration vessel to overflow back through the valve into the primary mixing vessel to mix with the incoming raw waste. This valve can be programmed to close at predetermined intervals so that the liquid level of the aerator will rise to overflow into the secondary settling tank.

It will also be appreciated that the liquid level of the primary mixing vessel is continually fluctuating with the inflow of raw waste and the periodic overflow to the secondary settling tank. To prevent levels that are too high or too low, liquid level regulators can be installed in the primary mixing vessel. If the level is too high, the valve closes until the liquid level in the primary mixing vessel drops. On the other hand, if the level in the primary mixing vessel becomes too low, the valve opens permitting a recycle of aerated sewage from the aeration vessel.

According to another preferred feature, the volume of the primary mixing vessel is equal to about 5 hours of estimated flow rate to carry the unit through periods when little or no flow of raw waste is entering the unit. The secondary settling tank preferably has a minimum capacity of four times the hourly flow rate and the activated sludge from the secondary settling tank can be pumped back to the aeration vessel and, if desired, also to the primary settling tank, at predetermined intervals.

Certain preferred embodiments of the invention will now be described with reference to the accompanying drawings, wherein:

FIG. 9 is an enlarged view showing details of the aerator baffle arrangement;

FIG. 10 is a sectional view of the aerator showing baffle and flow details, and

Figure 1:
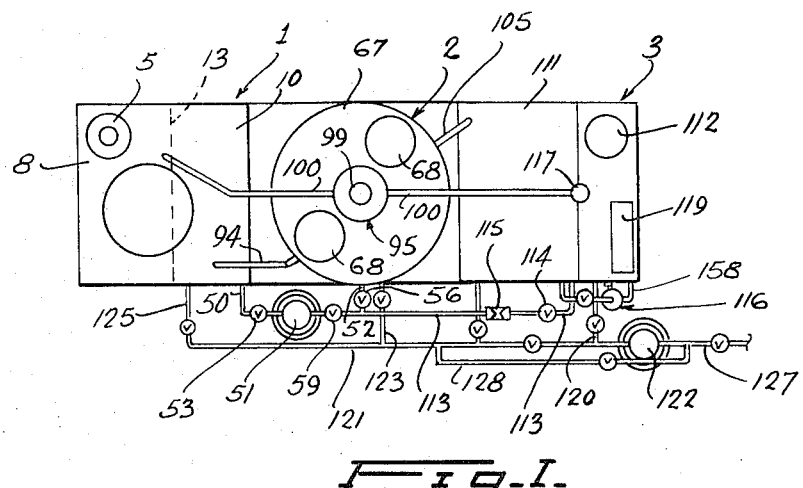
FIG. 1 is a plan view of a sewage treatment apparatus.
Figure 2:
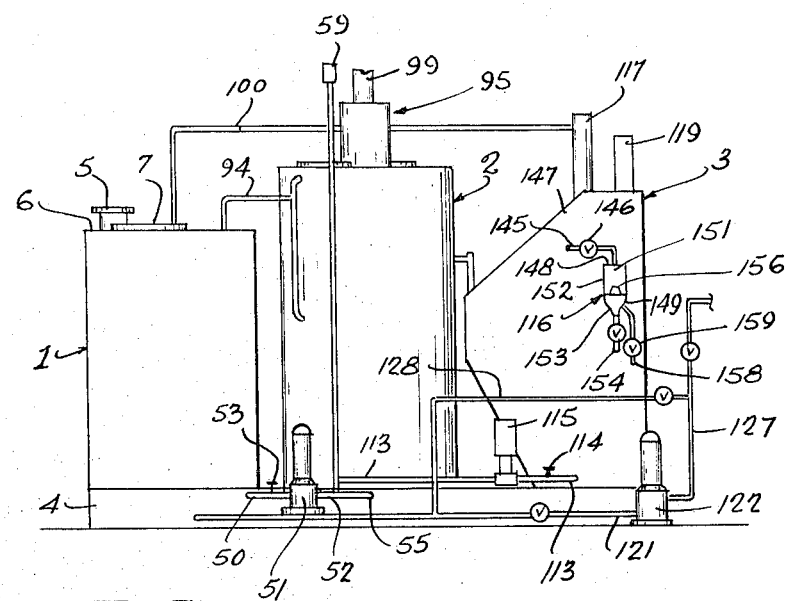
FIG. 2 is a front elevation of the apparatus of FIG. 1.

FIGS. 11a, b and c are sectional views showing flows between the primary mixing tank and the aerator.

With reference to FIGS. 1 to 4 of the drawings, the sewage treatment apparatus includes three separate tanks 1, 2 and 3 mounted in a row on a common, rectangular base 4. The tanks 1, 2 and 3 are preferably made of mild steel treated for corrosion, but they can be made of any other suitable material. The shape, dimensions and relative disposition of the tanks can be altered to fit the space available for the apparatus.

The first tank 1 is a primary receiving and mixing tank for raw sewage. Raw sewage enters tank 1 through an inlet port 5 in the top wall 6 of the tank. The top wall 6 is also provided with an observation port 7. The interior of the tank 1 is divided into two separate chambers 8 and 10 by a dividing wall 13 extending between the top wall 6 and the bottom wall 14 of the tank. The wall 13 includes perforations 17 through which material can pass between chambers 8 and 10 and can conveniently be in the form of a coarse screen baffle.

Chamber 10 is provided with an outlet duct 50 which connects the bottom of the chamber 10 to a pump 51. The outlet duct 50 is provided with a valve 53 before the pump 51. The pump 51 is connected to the second or aeration tank 2 by a pipe 52 which is provided with a valve 53′, an air injector 55 and a second valve 56. The air injector 55 is in the form of a conventional aspirator including a nozzled passage 57 and a stand pipe 58 meeting the passage 57 at a right angle and in fluid communication with the atmosphere. A check valve 59 on the upper end of the stand pipe 58 prevents the escape of liquid therethrough in case of a sewage backup in the apparatus.

Figure 3:
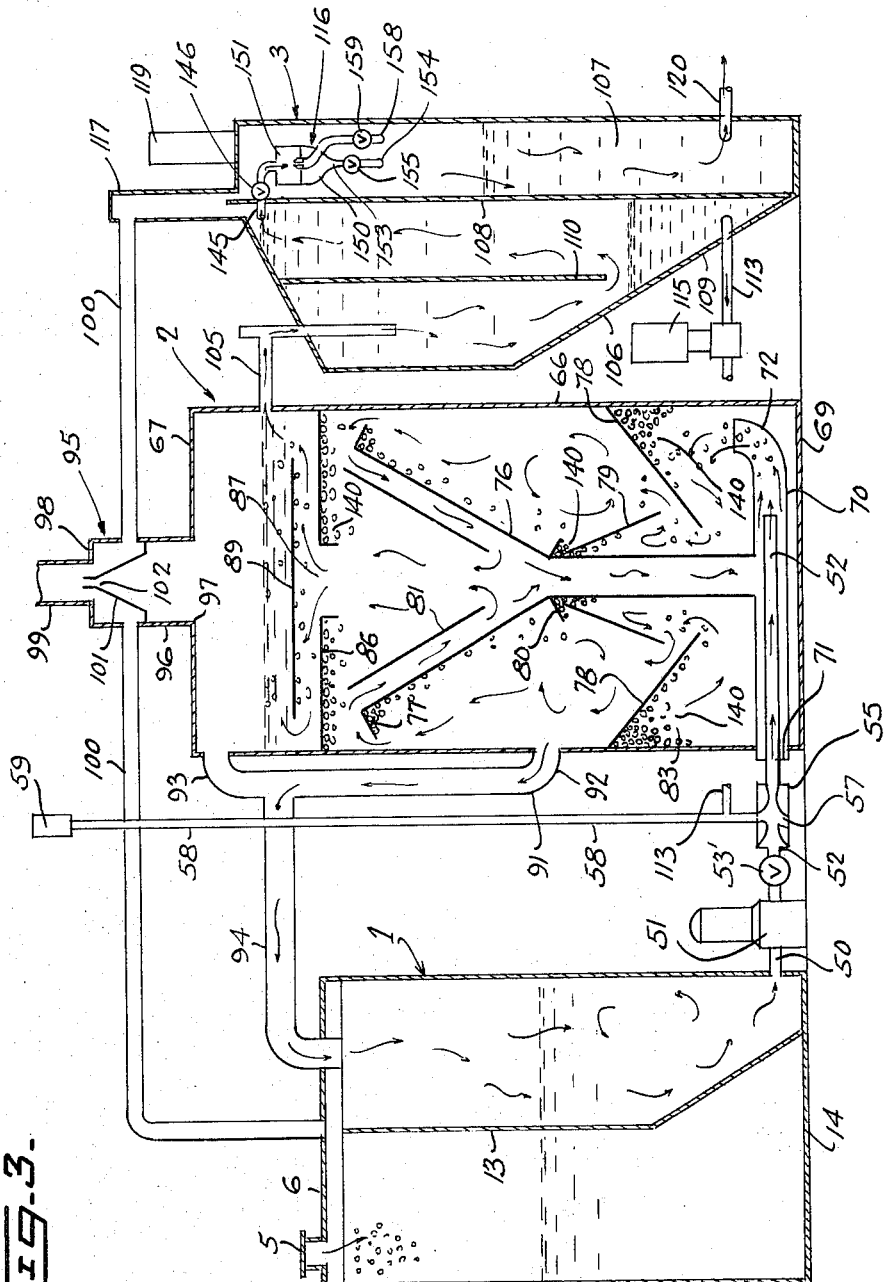
FIG. 3 is a schematic diagram showing the apparatus of FIG. 1 in operation.
Figure 4:
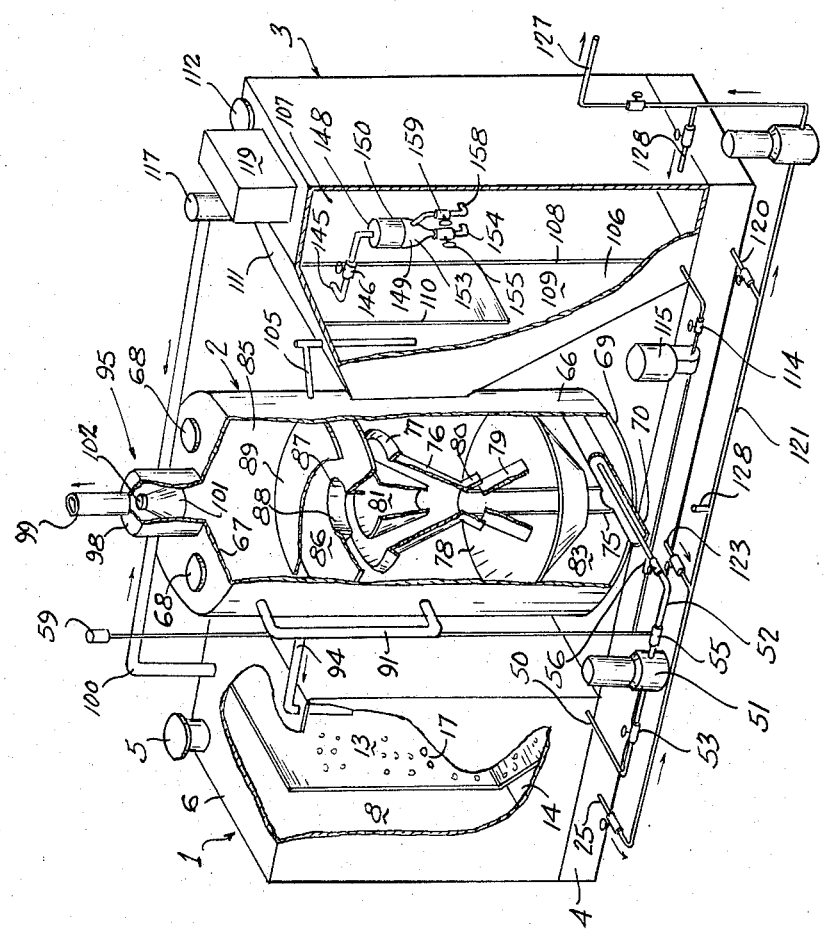
FIG. 4 is a partly cut-away perspective view of the apparatus of FIG. 1.

With particular reference to FIGS. 3 and 4, the aeration tank 2 includes a cylindrical side wall 66, a top wall 67 with observation ports 68 and a bottom wall 69. The pipe 52 extends into the tank 2 through a pipe section 70 located in the side wall 66 adjacent the bottom wall 69. The pipe section 70 is closed at its outer end 71 around the pipe 52 and extends across the bottom of the aeration tank 2 co-axial with the pipe 52. The inner end 72 of the pipe section 70 is curved to impart a swirling motion to fluid entering the aeration tank 2.

The aeration tank 2 is provided with a plurality of frusto-conical baffles the majority of which are connected to a centrally located, vertical tube 75, the lower end of which is in fluid communication with the pipe section 70. The upper end of the tube 75 flares outwardly in the form of an inverted frustoconical baffle 76. The upper end of the baffle 76 is provided with an annular downwardly and outwardly extending baffle in the form of a flange 77. Other frusto-conical baffles in the tank 2 include a baffle 78 extending outwardly and downwardly from the side wall 66 below the middle thereof, a baffle 79 which is connected to the tube 75, below the junction with baffle 76, by any suitable means such as pins (not shown), a baffle 80 which is connected at its upper narrower end to the upper end of the tube 75 at its junctions with the baffle 76 and a baffle 81 disposed co-axially within the baffle 76.

It will be seen that the aeration tank 2 is divided into two chambers 83 and 85 by a circular plate 86 located above the baffles described above. The plate 86 is provided with a central aperture 87 for fluid communication between the chambers 83 and 85, an annular flange 88 extending downwardly around the aperture 87. A smaller circular plate 89 is provided above the aperture 87 for directing fluid towards the side wall 66 of the tank 2.

Fluid communication between chambers 83 and 85, on the one hand, and tank 1, on the other hand, is achieved by means of an outlet manifold formed by a pipe section 91, the ends 92 and 93 of which open into the lower and upper chambers 83 and 85, respectively. The outlet manifold 91 is connected to the primary mixing tank 1 by a return duct 94 extending through the top wall 6 of tank 1 into the chamber 10.

An air vent 95 in the top wall 67 of the tank 2 exhausts gas and fumes from the tanks 1, 2 and 3 to the atmosphere. The vent 95 includes a cylindrical side wall 96 extending upwardly from around an opening 97 in the top wall 67 of the tank 2 and a top wall 98 with an outlet duct 99 communicating with the atmosphere. The outlet duct 99 will normally extend to the highest point on a marine vessel for safely exhausting fumes to the atmosphere. Ducts 100 feed gas and fumes to the vent 95 from the tops of tanks 1 and 3. The interior of the vent 95 is provided with a frusto-conical baffle 101, the lower, wider end of which is connected to the side wall 96 below the inlet ends of the ducts 100. Air from tank 2 passing through the orifice 102 in the top end of the baffle 101 creates suction in ducts 100 to actively draw gas and fumes from tanks 1 and 3.

An outlet duct 105 in the side wall 66 of tank 2 opposite the outlet manifold 91 and at the same height as the return duct 94 carries material from the aeration tank 2 to the final settling and chlorination tank 3.

The final settling and chlorination tank 3 is divided into two separate chambers 106 and 107 by a vertical wall 108. The first chamber 106 is a settling chamber which receives material from tank 2 via the duct 105. The bottom wall 109 of the chamber 106 slopes downwardly and inwardly towards the centre of the tank 3 to promote the flow of material to the bottom of the chamber. The chamber 106 is also provided with a baffle 110 extending downwardly from the top wall 111 of the chamber 106 to aid in the settling of solids, and an inspection port 112. A sludge return pipe 113, equipped with a conventional valve 114 and a timer operated solenoid valve 115, extends between the bottom of chamber 106 and the stand pipe 58.

Figure 5:
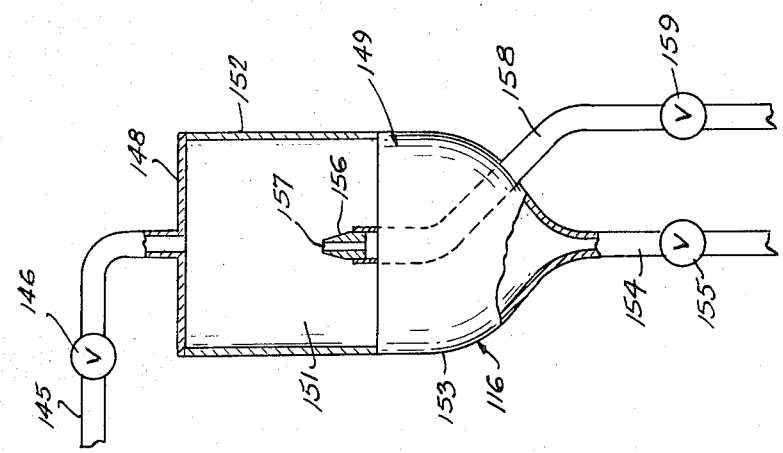
FIG. 5 is a partly sectioned view of a portion of a valve member used in the apparatus of FIGS. 1 to 4.

A valve member, generally indicated at 116, (see FIG. 5) is provided near the top wall 111 of tank 3 for passage of liquid from the settling chamber 106 to the chlorination chamber 107. The valve member 116 is connected to the chamber 106 by a duct 145 which is at the same height as the duct 105 connecting the aeration tank 2 and the settling and chlorination tank 3. The duct 145 is provided with a valve 146 and extends between a side wall 147 of the chamber 106 and a top wall 148 of a casing 149.

The casing 149 is formed by a side wall 150 defining a chamber 151. The side wall 150 includes a cylindrical, transparent plastic upper portion 152 and a bottom portion 153 which tapers downwardly to a duct 154. The duct 154 is provided with a valve 155 and is in fluid communication with the chamber 107. A nozzle 156 including an orifice 157 is located in the chamber 151, the lower end of the nozzle being connected to a duct 158 which passes through the bottom portion 153 of the side wall 150. The duct 158 is provided with a valve 159 and is also in fluid communication with the chamber 107.

The top wall 111 of the chamber 106 is provided with a gas outlet vent in the form of a cylinder 117 in fluid communication with the duct 100 for discharging gas and fumes from the tank 3. The vent 117 also serves as an overflow from chamber 106 to chamber 107. The material in chamber 107 is doused with a chlorine solution by means of a conventional chlorinator 119 of a commercially available, dry tablet type in which a solution of chlorine or of a chlorine compound is produced by spraying water over a chlorine salt. The water spray is controlled by a normally closed solenoid valve which is automatically operated by the same timer as the solenoid valve 115 in the sludge return pipe 113. The volume of the chlorination chamber 107 is such as to give adequate contact for the chlorine to effectively oxidize organic waste contained in the liquid fed into this chamber.

Liquid is discharged from the chamber 107 of the tank 3 through an outlet pipe 120, a discharge manifold 121 and a pump 122. The discharge manifold 121 is in the form of a pipe that is connected to each of the tanks 3, 2 and 1 by pipe sections 120, 123 and 125 for discharging liquid from tank 3 and for cleaning the tanks 1 and 2 of sludge. The discharge manifold 121 is connected to the inlet side of the pump 122, and an outlet pipe 127 is provided on the outlet side of this pump for discharging material from the tanks 1, 2 and 3 overboard. A return pipe 128 is provided between the pipe 127 and the discharge manifold 121 for returning material from the outlet side of the pump 122 to break up sludge which tends to clog the pipes during cleaning of tanks 1 and 2.

With reference to FIG. 3, in operation, raw sewage enters chamber 8 of the primary mixing tank 1 via inlet port 5. Larger solids, including paper and other waste materials, are retained in the chamber 8 for gradual digestion, and the remaining sewage passes through the perforations 17 in the wall 13 to the second chamber 10. The mixture of solids and liquids in the chamber 10 is in the form of a suspension.

The suspension in chamber 12 is drawn by the pump 51 through the pipes 50 and 52, and the air injector 55 to the aeration tank 2. As the suspension passes through the nozzle 57 in the air injector 55, air is drawn into the suspension through the valve 59 and standpipe 58. The suspension enters the chamber 83 of tank 2 wherein air is trapped by baffles, 76, 77, 78, 79, 80 and 81, and flange 88 forming air pockets 140 (see FIG. 3) which promote aeration of the suspension, and consequently the digestion of organic waste by the production of microorganisms.

The continuous contact of the air with the organic waste in the suspension in tank 2, in combination with the turbulence of the air-suspension mixture entering the tank 2 from the air injector 55, ensures a maximum transfer of oxygen to the bacteria present in the suspension for energy breakdown and digestion of the organic matter. The baffles 76 to 81 also encourage circulation of the suspension in chamber 83 of the aeration tank 2 further ensuring good contact between the solids and air pockets 140. The venturi effect created by the suspension entering the chamber 83 through co-axial pipes 52 and 70 also facilitates circulation of the suspension in chamber 83 by drawing the suspension down the tube 75. A portion of the aerated suspension in the tank 2 is returned to chamber 10 of the tank 1 through the outlet 92, manifold 91 and the return duct 94 for mixing with unaerated suspension in chamber 12 and re-circulation through the pump 51 and the injector 55 to the tank 2.

When the level of suspension in the tank 2 reaches that of the ducts 94 and 105, the controlled volume of suspension entering tank 2 displaces a like volume of aerated suspension, part of the displaced suspension returning to chamber 10 and the remainder flowing through the duct 105 to the tank 3. When the levels in tanks 1 and 2 are sufficiently high for continuous operation, the volume of material entering the chamber 10 of tank 1, through the screen 13 and the return duct 94, is substantially equal to the volume of material leaving tank 2 through the duct 105. There is normally a slight increase in waste feed level in the primary settling tank 1, but such a slight increase is not sufficient to upset the rate of feed of raw waste to the microorganisms being evolved in tank 2. It is important that this ratio of the rate of feed of raw sewage to the rate of microorganism production (F.M. ratio) be controlled to ensure proper digestion of organic waste, because, if a large volume of waste is suddenly introduced into the tank 2, the bacteria population is unable to digest this waste quickly enough and a poorly digested effluent results. Furthermore, the proper balance of bacteria in tank 2 may be upset, requiring a lengthy recovery period.

The overflow outlet 93 in tank 2 ensures that there is no surging of sewage between the tanks, and thus no bacterial imbalance. Should the level in tank 2 rise to overflowing, sewage can pass through the overflow outlet 93 to the return duct 94 and tank 1. While such overflow causes a slight imbalance, it is only temporary and the system returns to normal after a few hours.

The suspension entering the settling chamber 106 of tank 3 flows along the bottom wall 109 beneath the baffle 110, whereby aerated or activated sludge settles at the bottom of the chamber 106. At predetermined timed intervals the solenoid valve 115 in the sludge return line 113 opens to connect the bottom of chamber 106 to the air injector 55. Activated sludge is drawn through the injector 55 into the tank 2 to maintain the active bacterial population in tank 2 at a high level. The cyclic aeration of the suspension in tanks 1 and 2, combined with the periodic mixing of activated sludge with the sludge entering tank 2, increases the rate of digestion of organic waste.

As the activated sludge settles in chamber 106, a substantially clear liquid rises and flows through the valve member 116 into chamber 107 for chlorination. During normal operation, the valves 146 and 159 are open and valve 155 is closed, whereby liquid flowing into the chamber 151 through the duct 145 passes through the nozzle 156 and duct 158 into chamber 107. Thus the nozzle 156 controls the volume of liquid passing from chamber 106 into chamber 107. Consequently, during continuous operation of the apparatus, (i.e., when the tanks 1, 2 and chamber 106 are filled to the overflow level) the nozzle 156 also controls the rate of feed to the suspension from the tank 2 to the chamber 106, since the volume of liquid leaving the latter through valve member 116 will govern the amount of suspension which enters the chamber 106 from the aeration tank 2. Periodically, the valve 155 is opened to permit cleaning of the valve member by flushing liquid and any solids trapped in the chamber 151 through the duct 154.

Should the level in chamber 106 rise rapidly, the liquid overflows the top of the wall 108 in vent 117. The solenoid valve in the chlorinator 119 is opened at the same time as the solenoid valve 115, to spray a chlorine solution into the liquid in chamber 107 to destroy any pathogenic organisms that might still be present in the effluent. One way of achieving such destruction is to feed a solution of a hypochlorite into the liquid in chamber 107. The hypochlorite is broken down to produce hypochlorous acid which is a strong oxidizing agent, reactable with the unstable organic waste in the liquid to disinfect the latter. The stabilized liquid in chamber 107 is periodically discharged through duct 120, pump 122 and pipe 127.

Accumulated sludge in tanks 1 and 2 is periodically discharged through pipes 123 and 125, manifold 121, pump 122 and pipe 127. During sludge discharge, a portion of the discharge is returned to the manifold 121 via pipe 128 to loosen up the material being discharged, thereby ensuring steady flow through the discharge lines.

An alternative embodiment of the invention is illustrated in FIGS. 6 to 11. In this embodiment, a primary receiving and mixing tank 201, an aeration tank 202 and a settling tank 203 are mounted on a concrete base 200. The tanks 201, 202 and 203 are of rectangular configuration to simplify construction and also to provide a maximum of tank volume in a minimum of floor space. The tanks can be made from mild steel treated for corrosion and their dimensions can be altered as desired depending on the requirements of the particular installation.

Figure 6:
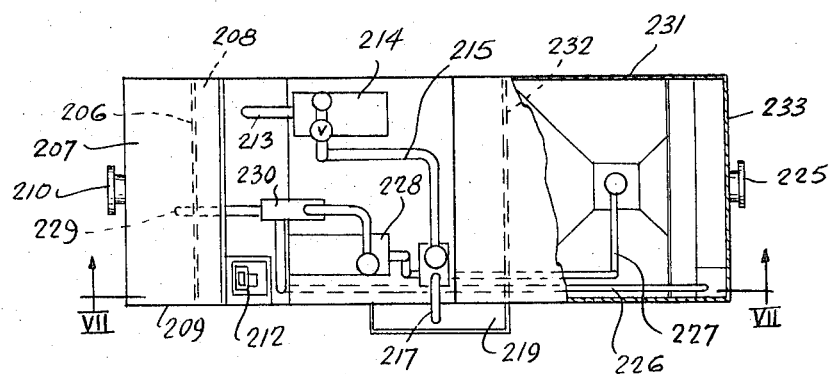
FIG. 6 is a plan view of a second embodiment of the invention.
Figure 7:
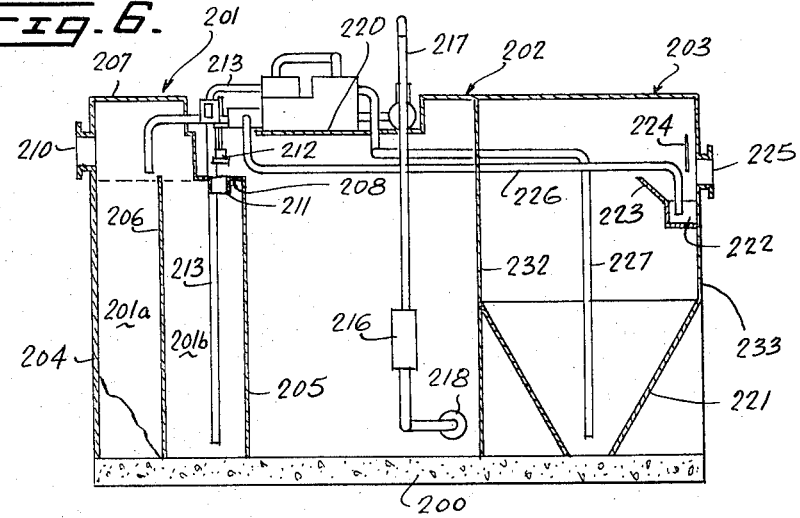
FIG. 7 is a front elevation of the apparatus of FIG. 6, with cut-away portions.
Figure 8:
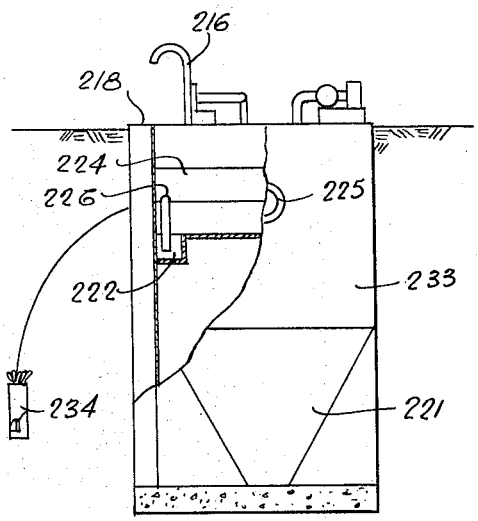
FIG. 8 is an end elevation of the apparatus of FIG. 6.

As illustrated in FIGS. 6 and 7, the three sections 201, 202 and 203 are all shown as a single unit and this is ideal for a small installation. However, for larger installations the three sections may be constructed separately and assembled on the site. Moreover, this unit can be used for either above ground installations or below ground installations. When they are placed below ground, they should be buried so that no more than 6 inches of the free board area is above grade level.

The primary receiving and mixing tank 201 is intended to receive raw sewage through inlet port 210 and is formed by unit front wall 209, unit rear wall 231, unit end wall 204 and divider wall 205 which separates tank 201 from the adjoining aerator tank 202. The interior of tank 201 is divided into two compartments 201a and 201b by means of a perforated divider wall 206. The tank 201 is also enclosed by unit top wall 207 and a lower horizontal top closing panel 208 which connects with divider wall 205.

A pump suction inlet pipe 213 extends through top 207 and downwardly into compartment 201b such that the pipe inlet is close to the bottom of compartment 201b. This pipe is at its upper end connected to the suction inlet of pump 214 which is mounted in a recessed section of top panel 207. This pump has an outlet line 215 which extend down the front wall 209 of the unit and connects to a venturi aerator 216. This venturi aerator draws air into the liquid flow from the pump 214 by way of air intake stand pipe 217. An additional line 218 continues from aerator 216 and through unit side wall 209 into a lower section of aerator 202. In this way sewage is pumped from compartment 201b, is mixed with air and then pumped into aerator 202.

A return flow port 211 is provided in the horizontal divider panel 208 above chamber 201b for recycling aerated sewage from aerator tank 202. This port 211 is opened and closed by means of a solenoid valve 212, thereby controlling the recycle flow into tank 201.

Looking next at the aeration tank 202, it will be seen that it has a front wall formed by unit front wall 209 and a back wall formed by unit back wall 231, an end wall formed by divider wall 205 and another end wall formed by divider 232 which divides the aerator tank 202 from the settling tank 203. The unit top wall 207 also encloses the top of the aerator tank. As can best be seen from FIGS. 9 and 10, between the bottom and back wall 231 is positioned an upwardly inclined baffle 236 and this is to prevent a dead space where solids will collect. Spaced a distance above this baffle 236 is a baffle 237 which extends between walls 205 and 232 and extends downwardly and inwardly from back wall 231. It also has a down turned lip 238 on its free edge. Three additional narrower baffles 239 with down turned free edge lips 240 are positioned in spaced relationship above baffle 237 and it will be seen that these baffles are also inclined downwardly. Looking particularly at FIG. 9, it will be seen that an opening 242 is provided at the end of baffle 237 remote from inlet pipe 218. The next two higher baffles contain alternate end openings 243 and 244 while the uppermost baffle has end openings 245 and 247 as well as a central opening 246. It will be seen that these openings create a flow pattern as shown by the arrows in FIG. 9.

Extending outwardly from front wall 209 is a skimmer chamber 219 having one tapering side wall 220. As will be seen from FIG. 10, this skimmer chamber operates as an overflow with the material at the top of aerator chamber flowing over weir 241 and down the skimmer chamber 219. The aerated sewage inlet line 218 passes through the lower section of the skimmer chamber and a second venturi 235 is provided which serves to draw material from the skimmer chamber back into the aerator chamber together with the sewage-air mixture being pumped through pipe 218. It will be noted that the outlet end of pipe 218 extends beneath the first baffle plate 237.

Adjoining the aerator tank 202 is a sludge settling tank 203 where scum and sludge is separated from the liquid to provide a clear effluent discharge. The upper section of settling tank 203 is of rectangular configuration with walls being formed by divider wall 232, unit front wall 209, unit back wall 231 and unit end wall 233. In the lower section of the settling tank are four inwardly inclined wall portions 221 forming a sludge collecting zone. An effluent discharge port 225 is provided in end wall 233 and in front of this outlet port is positioned a baffle 224 which prevents direct flow of sewage from the aerator tank 202 out through the effluent port. Immediately beneath the port 225 is a scum collecting chamber 222, to the upper edge of which is connected inwardly inclined baffle 223 which again serves to direct aerated sewage downwardly into the settling tank. An activated sludge recycle pipe 227 extends down into the lower section of settler 203 and this pipe connected to the suction inlet of sludge pump 228. This sludge pump has an outlet 229 which pumps activated sludge back into primary mixing tank 201. In this line 229 is mounted a venturi 230 to which is connected a pipe 226 extending into scum collector 222. This serves to draw the scum from the scum collector 222 into the flow of aerated sludge and feed this mixture back into tank 201.

When the units are arranged for below ground installation, a magnesium anode pack 234 is connected thereto to prevent corrosion.

In operation, the sewage recirculating pump 214 operates continuously so that there is a continuous injection of air and circulation of a sewage-air mixture. With valve 212 in an open position as shown in FIG. 11a, it will be seen that pump 214 draws sewage from the bottom of chamber 201b and discharges this mixed with air through pipe 218 into the bottom of aerator 202. This mixture together with recycling aerated sewage from skimmer chamber 219 enters the aerator 202 as a rather turbulent flow and initially flows across beneath baffle 237. A considerable amount of aeration takes place in this turbulent flow and bubbles are released at the liquid surface so that a layer of air bubbles 253 is built up beneath the baffle 237. This air-sewage mixture flows along beneath baffle 237 to its opposite end where it passes upwardly through vertical opening 242 and then along beneath the next higher baffle 239, through port 228 and so on upwardly through ports 244, 245, 246 and 247. Since this is a quite turbulent action, it will be appreciated that a considerable amount of mixing also takes place in the open area of the vessel adjacent the free ends of the baffle plates 237 and 239. With the valve 212 as shown in FIG. 11a, it will be seen that there is a continuous recycle of aerated sewage from the top of aerator 202 back through port 211 into compartment 201b. This recycle flow creates mixing within tank 201 in both compartments 201a and 201b.

The raw sewage which is periodically entering through port 210 enters into compartment 201a and the perforated divider wall 206 prevents the immediate transfer of large particles into the pump inlet. These large particles gradually break down within compartment 201a and pass through the perforations in wall 206. These perforations are kept open by the continuous mixing action of the recycle flow into compartment 201b.

As is illustrated in FIGS. 11a, b and c, an upper liquid level regulator 251 and a lower liquid level regulator 252 are installed into compartment 201a and these control the maximum and minimum liquid levels in primary mixing tank 201. FIG. 11a shows the situation where the liquid level has reached an undesirably low level and when the regulator 252 is inactivated because of insufficient raw sewage, the valve 212 is kept in the open position as shown until sufficient raw sewage enters tank 201 to raise the liquid level back to the normal operating range. On the other hand, if excessively large amounts of raw sewage enter through port 210 during a short period of time, the liquid level may rise to a very high level as shown in FIG. 11b and this will activate upper regulator 252 which closes valve 212 preventing any liquid recycle from the aeration tank 202. The valve will stay closed until the liquid level in tank 201 achieves its normal operating range.

The normal operating range will be as shown in FIG. 11c and, under normal operation, the valve 212 is closed at hourly intervals by means of a timer so that the pump 214 commences to lower the liquid level in tank 201 and accordingly increase the liquid level in tank 202. When this occurs, the liquid level in tank 202 rises above the level of baffle 249 in front of aerator outlet port 249 so that an outflow of aerated sewage takes place through port 248 into settling tank 203. This, of course, raises the liquid level in settling tank 203 so that there will be an outflow of clarified effluent.

Also as illustrated in FIG. 11, the perforated divider wall 206 may have an opening 253 in front of which is positioned a baffle 206a. This opening and baffle arrangement will permit flow of small pieces of material and liquid from compartment 201a to 201b even when the perforations are clogged.

The volume of the primary receiving tank can be conveniently equal to 5 hours of the estimated hourly flow through pump 214 to carry the unit through the periods when there is little or no flow of raw sewage entering into tank 201. The top of tanks 201, 202 and 203 can be either closed or open to the atmosphere.

The above invention is further illustrated by the following non-limiting example.

EXAMPLE

A series of pilot plant tests were conducted with sewage treatment units designed according to the present invention on various types of waste materials. These included normal city wastes as well as other waste materials having excessively high B.O.D. counts. Two sizes of units were utilized, one having an aeration volume of 128 Imperial gallons and the other having an aeration volume of 92 Imperial gallons.

The results of the tests are tabulated as follows:

|   | Aeration Volume Imp. Gallons | Type of Waste Treated | Average Daily Feed Rate | B.O.D. of Waste | B.O.D. Effl. | Raw Waste Susp. Solids | Effl. Susp. Solids | Effl. P.P.M. D.O. | App. C.F.M. Air | Hours of Aeration |
|---|---|---|---|---|---|---|---|---|---|---|
| I | 128 | Mink Waste | 880 | 677 / 82% reduction | 126 | 156 / 76% reduction | 38 | 0.90 | 5.3 | 3.6 hrs. |
| II | 92 | Septic Tank Effluent | 270 | 724 / 80.2% reduction | 142 | 220 / 66% reduction | 74 | 0.50 | 5.3 | 8 hrs. |
| III | 128 | Septic Tank | 300 | 735 / 88.7% reduction | 83 | 241 / 80.5% reduction | 47 | 0.80 | 4.0 | 10.2 hrs. |
| IV | 128 | Normal City Waste | 321 | 260 / 92% reduction | 20.81 | 219 / 91.4% reduction | 19 | 3.92 | 1.8 | 9.6 hrs. |

It should be noted that the first three tests were run under abnormal conditions such as overloading, very high B.O.D. and insufficient aeration time. Moreover, the waste materials being treated in tests II and III were septic with B.O.D. counts ranging from 500 to 1,800 P.P.M. Even under these conditions the average B.O.D. reduction was in the order of 80 percent.

The fourth test was run at a municipal sewage treatment plant in Brantford, Ontario and the B.O.D. of the influent ranged from 180 to 420 P.P.M. (average of 260 P.P.M.). It will be seen that the unit performed exceedingly well with an average B.O.D. reduction of 92 percent. The effluent B.O.D. averaged 20.1 P.P.M. On the basis of the Brantford test the unit was approved for commercial use by government authorities.

I claim:

1. A sewage treatment apparatus comprising:
    a. a primary receiving and mixing tank for receiving raw sewage;
    b. means in said primary receiving tank for separating larger solids from the sewage;
    c. a vertical cylindrical aeration tank containing a series of downwardly inclined baffles arranged to trap pockets of air and to circulate sewage along a tortuous path across the air pockets, said baffles including a first truncated inverted conical baffle in a lower region extending inwardly and downwardly from the cylindrical wall and forming an axial opening, a second truncated inverted conical baffle in an upper central region of the aerator having a cylindrical extension connected to the lower end thereof for collecting aerated sewage in an upper region of the aerator and carrying it downwardly through the axial opening of the first baffle and at least one further truncated conical baffle extending outwardly and downwardly from an upper region of said second baffle;
    d. pump means for pumping a stream of said sewage from the primary receiving tank into a bottom region of the aeration tank beneath said first baffle;
    e. a venturi aerator for introducing air into the stream of sewage being pumped into the aeration tank;
    f. means for recycling a portion of aerated sewage from an upper region of said aeration tank to said primary receiving tank for mixing with un-aerated sewage;
    g. a settling tank in fluid communication with said aeration tank for receiving aerated sewage from an upper region of said aeration tank and separating activated sludge from the liquid portion of the sewage; and
    h. means for returning said activated sludge to said aeration tank at a location beneath said first baffle for mixing with said aerated sewage.

2. A sewage treatment apparatus according to claim 1 wherein the primary receiving tank is divided into two compartments by means of a perforated divider wall, one compartment being a raw sewage receiving compartment and the other being a mixing compartment.

3. A sewage treatment apparatus according to claim 2 wherein the pump means is connected to pump sewage from the mixing compartment.

4. A sewage treatment apparatus according to claim 3 wherein the means for recycling aerated sewage to the primary receiving tank comprises a closable valve opening between an upper portion of the aerator and primary receiving tank.

5. A sewage treatment apparatus according to claim 4, wherein the primary receiving and mixing tank has liquid level indicators which indicate maximum and minimum liquid levels and which are operatively connected to the valve.

6. A sewage treatment apparatus according to claim 1 which includes a pump for pumping activated sludge from the settling tank into the primary receiving and mixing tank.

7. A sewage treatment apparatus according to claim 6 wherein an inductor is provided in the flow line from the sludge pump, said inductor drawing scum from a scum collector in the settling tank.

8. A sewage treatment apparatus according to claim 1 wherein the settling tank includes a zone for contacting effluent with chlorine.

* * * * *